No. 857,801. PATENTED JUNE 25, 1907.
H. F. HARFST & R. B. PRATER.
MACHINE FOR SOLDERING CAPS ON CANS.
APPLICATION FILED MAR. 20, 1907.

3 SHEETS—SHEET 1.

WITNESSES:
E. F. Stewart
Herbert D. Lawson

Henry F. Harfst,
Robert Prater
INVENTORS
By C. A. Snow & Co.
ATTORNEYS

No. 857,801. PATENTED JUNE 25, 1907.
H. F. HARFST & R. B. PRATER.
MACHINE FOR SOLDERING CAPS ON CANS.
APPLICATION FILED MAR. 20, 1907.
3 SHEETS—SHEET 3.
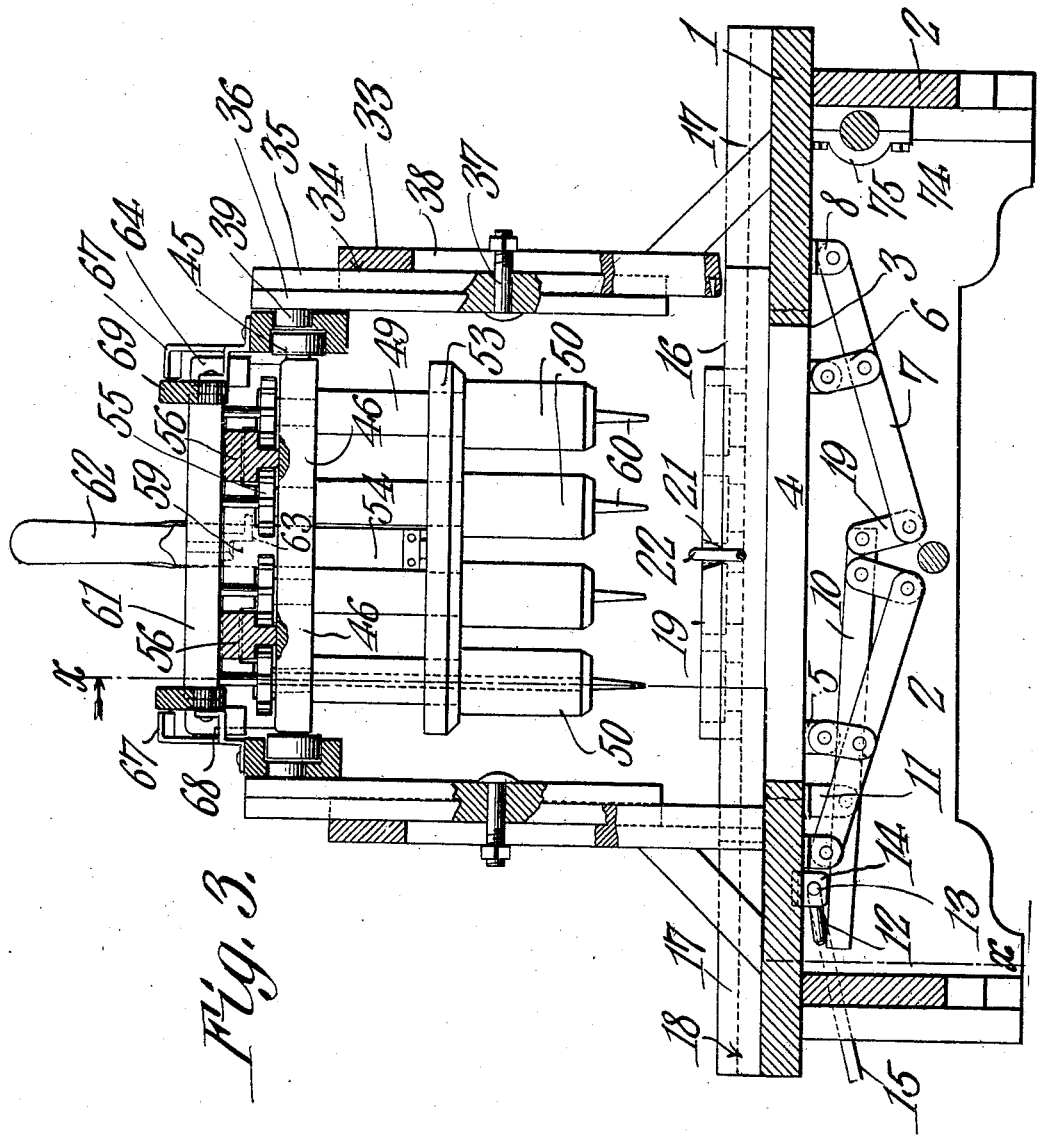
WITNESSES:
Henry F. Harfst,
Robert Prater
INVENTORS
By
ATTORNEYS

UNITED STATES PATENT OFFICE.

HENRY F. HARFST AND ROBERT B. PRATER, OF META, MISSOURI.

MACHINE FOR SOLDERING CAPS ON CANS.

No. 857,801.  Specification of Letters Patent.  Patented June 25, 1907.

Application filed March 20, 1907. Serial No. 363,454.

*To all whom it may concern:*

Be it known that we, HENRY F. HARFST and ROBERT B. PRATER, citizens of the United States, residing at Meta, in the county of Osage and State of Missouri, have invented a new and useful Machine for Soldering Caps on Cans, of which the following is a specification.

This invention relates to machines for soldering caps on cans such as used for holding vegetables, fruits, etc., and the object of the invention is to provide novel means whereby a large number of soldering irons can be simultaneously used for spreading solder upon the cans placed thereunder, said irons being combined with means for holding the caps firmly upon the cans during the soldering operation.

A still further object is to provide means whereby the irons can be quickly heated in a simple and efficient manner.

A still further object is to provide novel means whereby the irons can be readily shifted into position above the heater or above the cans to be soldered without the necessity of providing intricate mechanism for that purpose.

Another object is to provide means whereby the cans can be quickly placed in proper position beneath the irons, the can holder being shiftable toward and away from the irons.

With these and other objects in view the invention consists of certain novel features of construction and combinations of parts which will be hereinafter more fully described and pointed out in the claims.

In the accompanying drawings is shown the preferred form of the invention.

Figure 1:
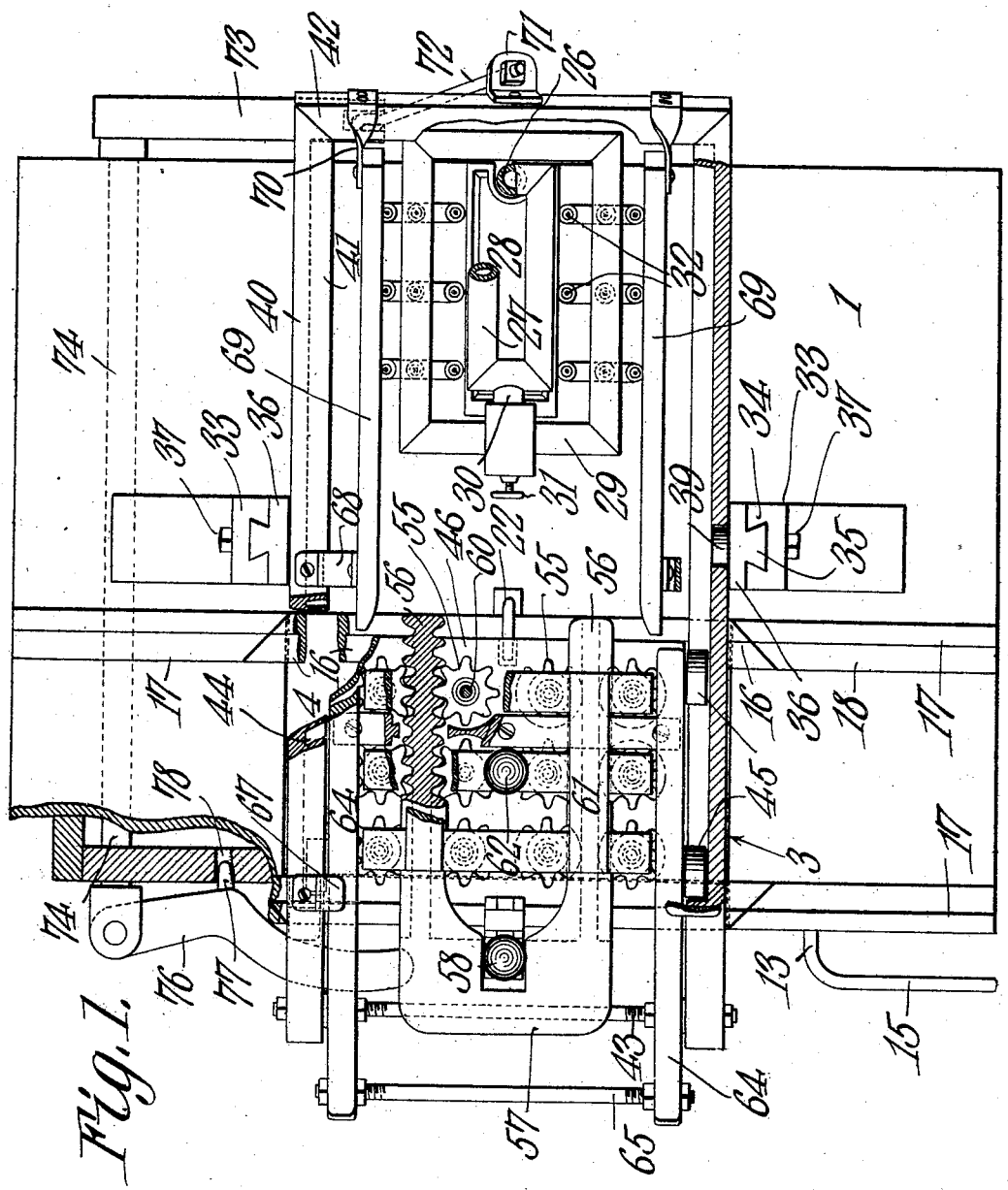
Figure 2:
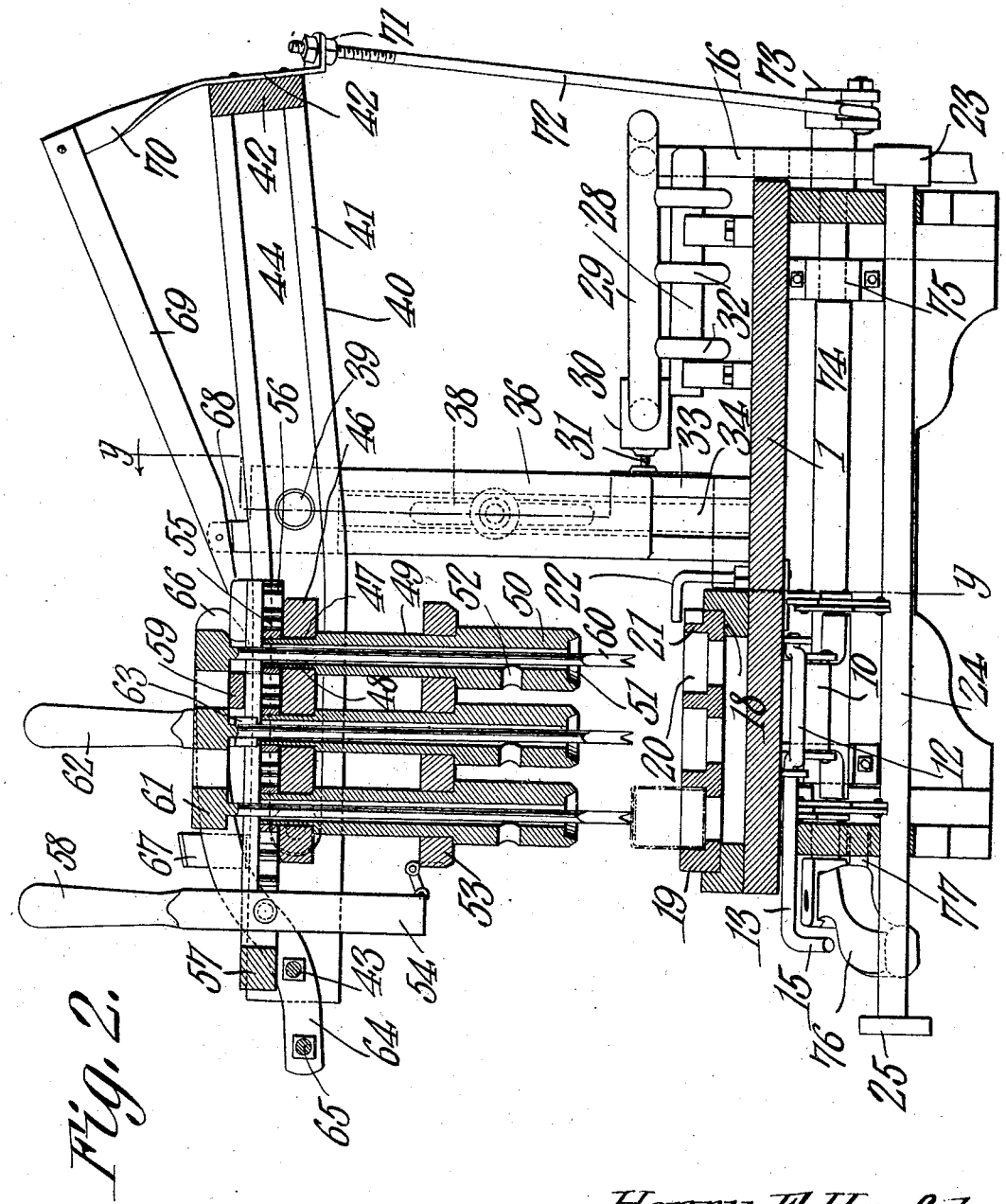

In said drawings: Figure 1 is a plan view of the apparatus, portions thereof being broken away; Fig. 2 is a longitudinal section taken on the line $x$—$x$, Fig. 3; and Fig. 3 is a transverse section taken on the line $y$—$y$, Fig. 2.

Referring to the figures by characters of reference, 1 is the base of the machine, the same being suitably supported as by strips 2 and formed within the front portion of the base is an opening 3 in which is supported a movable platform 4. This platform has ears 5 depending from the end portions thereof and each ear is connected by a link 6 with a lever 7. All of the levers are fulcrumed at one end upon ears 8 depending from the base beyond the ends of the platform and the inner or adjoining ends of the levers are connected by links 9 with an actuating lever 10 fulcrumed between ears 11 depending from the base. The upper end of this lever is contacted by a crank 12 formed with a rod 13 which is fulcrumed in the front supporting strip 2 and within ears 14 depending from the base and this rod has an arm 15 at its outer end by means of which the rod can be partly rotated so as to push downward upon the lever 10 to force the links 6 upward against the platform 4 and raise it. Downward movement of the platform is prevented by rail sections 16 which extend longitudinally along the upper face of the platform and beyond the ends thereof, the end portions of the rail members being designed to loosely rest upon the base 1. These rail members are disposed to normally aline with rail members 17 secured upon the base and each of the rail members has a longitudinally extending supporting shoulder 18 upon its inner face. The rails are spaced apart a sufficient distance to permit a tray 19 to slide therebetween upon the shoulders 18 and said tray is preferably formed with a plurality of counterbored recesses 20 each of which is designed to receive a can which will fit snugly therein. The number of these recesses will depend upon the number of cans to be supplied to the machine at each operation. A notch 21 is formed at the center of the inner edge of the tray and a centering finger 22 is connected to the base and is designed to overhang one of the rail members and project into the notch 21 so as to act as a gage to indicate when the tray is in proper position beneath the soldering irons.

A valve casing 23 is arranged adjacent the rear end of the base and the valve therein is adapted to be actuated by a stem 24 which is arranged longitudinally beneath the base and projects beyond the front thereof and is provided with a small hand wheel 25 whereby the valve casing 23 can be readily opened or closed. The casing 23 is designed to be connected in any suitable manner with a fuel reservoir and extending upward from this casing is a pipe 26 which opens into an angular vaporizing tube 27 disposed above a trough 28. A distributing pipe 29 surrounds the tube 27 and is connected thereto by a pipe 30 having a valve 31. This distributing tube has a plurality of burners 32 connected therewith. Supported upon the base 1 adjacent opposite sides thereof are standards 33 each of which has a dove-tail groove formed longitudinally in one face thereof. These grooves 34 are adapted to receive tongues 35 formed longitudinally upon slide extensions 36 upon the standards. The extensions and standards are designed to be secured in adjusted relation by means of bolts 37 extending through slots 38 in the standards 33. Each of the extensions 36 has a stud 39 projecting inwardly from the upper portion thereof. These studs constitute pivots for the rocking frame 40. This frame is made up of side rails 41 connected at one end by a cross rail 42 while the front ends of the side rails are connected by means of a cross rod 43. Those portions of the side rails in rear of the studs 39 are disposed at an angle to the remaining or front portions of the side rails and formed longitudinally within the inner faces of the rear portions of the side rails and within the greater part of the front portions thereof are guide grooves 44 adapted to receive the rollers 45 of the carriage 46. This carriage is preferably in the form of a block having parallel series of openings 47 therein in each of which is rotatably mounted the reduced upper end 48 of a tubular stem 49. This stem has a cylindrical soldering iron 50 in its lower end, the bottom of which is counterbored, as shown at 51, while a vent opening 52 is formed in the wall of the soldering iron at a point between its ends. The lower portions of the stems rotate within a block 53 to which is hingedly connected the lower end of a lever 54. A gear 55 is keyed or otherwise secured to the upper end of each of the stems 49 and is disposed directly above the carriage 46 and disposed between the rows of gears are rack bars 56 having teeth along opposite faces thereof. These rack bars are connected at their front ends, as shown at 57, and the lever 54 is fulcrumed between the rack bars adjacent their front ends and extends upward therefrom to form a handle 58. The rack bars are held against displacement by a retaining strip 59 which is secured upon opposite portions of the carriage and extends transversely thereabove and over the rack bars.

Loosely mounted within each of the stems 49 and its iron 50 is a holding rod 60, the lower end of which is forked and normally disposed below the lower end of the irons. All of these rods are connected at their upper ends to a head 61 which normally rests on the retaining strip 59. A handle 62 is mounted to rotate within this head and has an angular tongue 63 connected to its lower end which is designed when the head is raised to be turned in position above the retaining strip 59 to support the head out of normal position and with the lower ends of the rods 60 raised into the countersunk ends of the irons.

Pivotally mounted on opposite end portions of the cross rod 43 are locking strips 64 connected at their outer ends by a cross rod 65, while their inner ends form locking hooks 66 designed to lap and engage the end portions of the retaining strip 59 to lock the carriage against movement and with one of each of its side rollers against the forward ends of the grooves 44. Angular retaining strips 67 are pivotally mounted upon the side strips 41 and are disposed to lap the locking strips 64 and limit their upward movement.

Brackets 68 extend inward from the side strips 41 above and adjacent the opposite studs 39 and connected to these brackets are the lower ends of inclined rails 69 the upper ends of which are supported by standards 70 preferably connected to the cross strip 42. The lower ends of these inclined rails are preferably pointed and disposed beneath the plane occupied by the lower surface of head 61.

A bracket 71 extends rearwardly from the center of the cross strip 42 and adjustably connected to it is a rod 72 pivotally attached to an arm 73. This arm is located at the rear end of a rock bar 74 which is disposed beneath the base 1 and is mounted in suitable bearings 75. Pivotally connected to the front end of this rock bar is a manipulating lever 76 having a lug 77 projecting therefrom and disposed to be seated within a recess or aperture 78 in the front strip 2.

In using the apparatus herein described oil is first admitted to the vaporizing tube 27 after which some oil is placed within the trough 28 and ignited. This will cause the contents of the tube 27 to be vaporized and the vapor will be caused to pass from the burners 32 where it will be ignited. When the parts are in their normal positions the platform 4 is lowered and the stud 77 is seated within the recesses 78 thereby locking the frame 40 with its front portion lowermost and with the irons supported above the platform 4. When it is desired to heat the irons the lever 76 is unlocked and swung downward. This will cause a corresponding movement of arm 73 which will pull downward on the rear end of the frame 40 through rod 72. By pulling downward on the cross bar 65 the locking strip 64 will be disengaged from the retaining strip 59 and the carriage 46 will be free to travel down the inclined grooves 44. The head 61, however, will ride along the upper edges of the rail 69 during this movement of the carriage and while the irons 50 are being brought into position in this manner above the burner, the head 61 is being raised by the rails 69 so as to raise the holding rods 60 into the irons. The irons are thus brought into position to be thoroughly heated and during this operation a tray 19 can be filled with cans to be soldered, after which the tray can be slid longitudinally along the shoulders 18 or rails 17 and onto the corresponding shoulders of the rail 16 on platform 4. After the irons have been sufficiently heated the frame 40 is rocked back into its normal position by means of lever 76, and said lever is then locked by placing its stud 77 within opening 78. The holding rods 60 will thus be brought into position directly above the caps on the cans. By swinging the arm 15 downward, the crank 12 movable therewith will press down on lever 10 and cause the platform 4 to move upward. The cans will therefore be pressed against the rods 60 and move them longitudinally until the caps of the cans are brought into contact with the counterbored ends of the irons 50. The weight of the rods 60 and the head 51 will be sufficient to hold the caps against displacement during the soldering operation. While the parts are in this position the lever 58 is moved in one direction and as a result the rack bars 56 will rotate the gears 55 simultaneously. The heated irons will therefore thoroughly spread the solder which has been deposited upon the caps. As soon as the soldering operation has been completed platform 4 can be lowered by reversing the movement of lever 15 and the tray 19 can then be withdrawn and a new supply of cans placed in position. This operation can be continued until the irons become too cool to melt the solder whereupon the frame 40 can be again tilted so as to cause the carriage to move by gravity into position above the heater. By providing adjustable standards the apparatus can be arranged for use in connection with cans of different heights and as the rod 72 is adjustably connected to the bracket 71 this adjustment of the frame 40 will not be interfered with. By providing the revoluble handle 62 with an angular tongue 63 it becomes possible to partly raise the head 61 so as to hold the rods 60 retracted simply by rotating the handle so as to bring its tongue in position upon the retaining strip 59.

What is claimed is:

1. In a machine of the character described the combination with a tiltable frame; of a gravity operated carriage movably mounted upon the frame, and a soldering device movable with the carriage.

2. In a machine of the character described the combination with a frame; of a carriage mounted to travel thereon, a soldering device supported by the carriage, and means for tilting the frame to actuate the carriage by gravity.

3. In a machine of the character described the combination with a tiltable frame; of a gravity operated carriage movably mounted thereon, a soldering device supported by the carriage, a cap holding device movably connected to the carriage, and means for automatically moving said device longitudinally during the movement of the carriage.

4. In a machine of the character described the combination with a tiltable frame; of a carriage movably mounted thereon, a soldering device movable with the carriage, a cap holding device longitudinally movable within the carriage, a deflecting device, and means for tilting the frame to actuate the carriage by gravity and to direct the cap holding device against the deflecting device.

5. In a machine of the character described the combination with a frame; of a carriage movably mounted thereon, a soldering device movable with the carriage, a cap holding device within the carriage, and means disposed, when the carriage is moved, to shift the cap holding device within the carriage.

6. In a machine of the character described the combination with a frame; of a carriage movably mounted thereon, a soldering device supported by the carriage, a cap holding device movably mounted within the carriage, means for tilting the frame to actuate the carriage by gravity, and means disposed, when the carriage is moved, to shift the cap holding device within the carriage.

7. In a machine of the character described the combination with a heater; of a frame supported above the heater, a carriage movably mounted thereon, a soldering device movable with the carriage, and means for tilting the frame to direct the carriage by gravity into position above the heater.

8. In a machine of the character described the combination with a frame, and an inclined rail thereon; of a carriage movably mounted upon the frame, a soldering iron movable with the carriage, a cap holding device movably mounted within the carriage, and means for tilting the frame to actuate the carriage by gravity and to direct the cap holding device onto the rail.

9. In a machine of the character described the combination with a frame, and an inclined rail thereon and movable therewith; of a carriage movably mounted upon the frame, a soldering device supported by the carriage, a cap holding device movably mounted within the carriage, a head thereon, and means for tilting the frame to actuate the carriage by gravity and direct the head onto the rail.

10. In a machine of the character described the combination with a frame; of a carriage movably mounted thereon, a soldering device supported by the carriage, means for tilting the frame to actuate the carriage by gravity, and means for engaging the carriage to lock the same against movement.

11. In a machine of the character described the combination with a frame; of a roller supported carriage movably mounted upon the frame, a soldering device movable with and suspended from the carriage, means for tilting the frame to shift the carriage by gravity longitudinally of the frame, and means for locking the carriage against movement.

12. In a machine of the character described the combination with a vertically adjustable frame; of a carriage movably mounted thereon, a soldering device supported by and movable with the carriage, and adjustable means for tilting the frame to shift the carriage by gravity longitudinally of the frame.

13. In a machine of the character described the combination with a frame; of a carriage movably mounted thereon, a soldering device movable with the carriage, means for tilting the frame to shift the carriage by gravity longitudinally of the frame, and a lock for said means.

14. In a machine of the character described the combination with a tiltable frame, and means for actuating it; of a gravity operated carriage movably mounted upon the frame, a plurality of revoluble soldering devices supported by the carriage, and means upon the carriage for simultaneously rotating said devices.

15. In a machine of the character described the combination with a tiltable frame and means for actuating it; of a carriage movably mounted upon the frame, a plurality of tubular soldering devices revolubly mounted within and suspended from the carriage, gears secured to said devices, and racks movably mounted upon the carriage and engaging the gears to simultaneously rotate them.

16. In a machine of the character described the combination with a frame and a carriage movable longitudinally thereon; of a plurality of revoluble soldering devices mounted therein and suspended therefrom, gears revoluble with said devices, connected racks movably mounted upon the carriage and meshing with the gears to simultaneously rotate them, and a rack actuating lever movable with the carriage.

17. In a machine of the character described the combination with a frame; of a carriage movably mounted thereon, a plurality of tubular soldering devices supported by and movable with the carriage, a plurality of cap holding devices movably mounted within the soldering devices, a head connected to the cap holding device and movable therewith, means for tilting the frame to actuate the carriage by gravity, and means disposed, when the carriage is moved, to engage the head and shift the cap holding devices longitudinally.

18. In a machine of the character described the combination with a heater; of a frame supported thereabove, a carriage movably mounted upon the frame, a soldering device movable with the carriage, a cap holding device movably mounted within the carriage and normally projecting beyond the soldering device, means for tilting the frame to shift the carriage and soldering device by gravity into position above the heater, and means for automatically shifting the cap holding device away from the heater.

19. In a machine of the character described the combination with a heater; of a frame supported thereabove, a carriage movably mounted upon the frame, a plurality of revoluble soldering devices movable with the carriage, a plurality of connected cap holding devices movably mounted within the soldering devices and normally projecting therebeyond, means for shifting the frame to move the carriage by gravity into position above the heater, and means disposed to shift the cap holding devices away from the heater longitudinally within the soldering devices during the movement of the carriage.

20. In a machine of the character described the combination with a movable frame; of a carriage movably mounted upon the frame and disposed to be shifted thereon by the movement of the frame, and a soldering device movable with the carriage.

21. In a machine of the character described the combination with a base, a platform, and guide rails upon the platform and base; of a plurality of simultaneously rotating soldering devices supported above the platform, a rock shaft, means operated by the movement of said shaft to shift the platform toward or away from the soldering devices.

22. In a machine of the character described the combination with a base having a tray supporting platform movably mounted thereon, means for actuating the platform, and a heater; of a carriage movably supported within the base, a plurality of simultaneously rotatable soldering devices movable with the carriage, and gravity operated means for shifting the carriage into position above the heater and the platform.

23. In a machine of the character described the combination with a base; of a platform movably mounted thereon, an actuating lever, intermediate levers fulcrumed upon the base and connected to the actuating lever, link connections between the intermediate levers and the corner portions of the platform, and means for depressing the actuating lever to raise the platform.

24. In a machine of the character described the combination with a base, a platform movably mounted thereon, and guide rails disposed upon the base and the platform; of an actuating lever, intermediate levers movably connected thereto and fulcrumed upon the base, pivotal connections between said intermediate levers and the corner portions of the platform, and manually operated means for moving the actuating lever to shift the platform.

25. In a machine of the character described the combination with a base, standards projecting therefrom, and extensions adjustably mounted upon the standards; of a tiltable frame supported by the extensions, said frame having inner longitudinal grooves, a carriage, rollers thereon mounted to travel within the grooves, soldering devices movable with the carriage, and manually operated means for tilting the frame to actuate the carriage by gravity.

26. In a machine of the character described the combination with a tiltable frame; of a carriage mounted to travel longitudinally thereof, a plurality of tubular soldering devices mounted to rotate within the carriage, actuating holding devices movable longitudinally within the soldering devices, a head rigidly connected to the cap holding devices, a handle mounted to rotate therein, and means integral with the handle for supporting the head and the cap holding devices in raised position.

In testimony that we claim the foregoing as our own, we have hereto affixed our signatures in the presence of two witnesses.

HENRY F. HARFST.
ROBERT B. PRATER.

Witnesses:
W. D. BURD,
PAUL SCHULZ.